United States Patent
Koizumi

(10) Patent No.: US 11,614,680 B2
(45) Date of Patent: Mar. 28, 2023

(54) ILLUMINATOR AND PROJECTOR

(71) Applicant: SEIKO EPSON CORPORATION, Tokyo (JP)

(72) Inventor: Ryuta Koizumi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 89 days.

(21) Appl. No.: 17/338,222

(22) Filed: Jun. 3, 2021

(65) Prior Publication Data
US 2021/0382382 A1 Dec. 9, 2021

(30) Foreign Application Priority Data
Jun. 4, 2020 (JP) .............................. JP2020-097676

(51) Int. Cl.
G03B 21/20 (2006.01)
G03B 33/12 (2006.01)

(52) U.S. Cl.
CPC ........ G03B 21/204 (2013.01); G03B 21/2066 (2013.01); G03B 33/12 (2013.01)

(58) Field of Classification Search
None
See application file for complete search history.

(56) References Cited

U.S. PATENT DOCUMENTS

| 2014/0268063 | A1* | 9/2014 | Akiyama | G03B 21/2073 362/19 |
| 2017/0082912 | A1* | 3/2017 | Wakabayashi | G03B 21/2013 |
| 2017/0153538 | A1* | 6/2017 | Kawasumi | G02B 27/10 |
| 2018/0373132 | A1 | 12/2018 | Miyazaki | |
| 2019/0187545 | A1 | 6/2019 | Arakawa | |

FOREIGN PATENT DOCUMENTS

| CN | 108533980 A | 9/2018 |
| JP | 2017-097310 A | 6/2017 |
| JP | 2017-194523 A | 10/2017 |
| JP | 2019-008193 A | 1/2019 |

* cited by examiner

Primary Examiner — Bao-Luan Q Le
Assistant Examiner — Danell L Owens
(74) Attorney, Agent, or Firm — Oliff PLC

(57) ABSTRACT

An illuminator includes a first light emitter that outputs light to a first wavelength band, a first parallelizer parallelizes the first light outputted from the first light emitter, a wavelength converter having a first surface on the first light and a second surface converts the first light into second light belonging to a second wavelength band, an optical element reflects one of light to the first and second wavelength bands and transmits the other, a first focusing system between the first parallelizer and the optical element has positive power, a diffuser between the first focusing system and the optical element diffuses the first light that exits the first system, and a second focusing system between the optical element and the wavelength converter has positive power, and the second system has a focal point between the principal point of the second system and the second surface of the wavelength conversion layer.

7 Claims, 9 Drawing Sheets

ILLUMINATOR AND PROJECTOR

The present application is based on, and claims priority from JP Application Serial Number 2020-097676, filed Jun. 4, 2020, the disclosure of which is hereby incorporated by reference herein in its entirety.

BACKGROUND

1. Technical Field

The present disclosure relates to an illuminator and a projector.

2. Related Art

As a light source apparatus used in a projector, there has been a proposed light source apparatus using fluorescence emitted from a phosphor when the phosphor is irradiated with excitation light outputted from a light emitter.

JP-A-2017-194523 discloses a light source apparatus including light sources that each output excitation light, a wavelength converter that converts the excitation light into fluorescence, a dichroic mirror that reflects the excitation light and transmits the fluorescence, and a focusing lens unit that guides the excitation light having exited out of the dichroic mirror to the wavelength converter.

JP-A-2019-8193 discloses a light source apparatus including a first light source that outputs excitation light, a second light source that emits fluorescence when irradiated with the excitation light, a dichroic mirror that reflects the excitation light and transmits the fluorescence. In the light source apparatus described above, a microlens array and an adjustment lens that adjusts the cross-sectional shape of a luminous flux are provided between the laser light source that outputs excitation light and the dichroic mirror.

In the light source apparatus disclosed in JP-A-2017-194523, when the dichroic mirror is larger than the luminous flux width of the excitation light having exited out of the wavelength converter, a large portion of the excitation light is reflected off the dichroic mirror and returns toward the light sources, resulting in a problem of a decrease in the proportion of the excitation light, that is, the blue light used as illumination light. In the light source apparatus disclosed in JP-A-2017-194523, however, a first lens array and a second lens array are provided between the light sources and the dichroic mirror. Therefore, on one hand, the two lens arrays homogenize the excitation light distribution on the wavelength converter, but on the other hand, it is difficult to reduce the size of the dichroic mirror.

Similarly, in the light source apparatus disclosed in JP-A-2019-8193, the microlens array is provided between the laser light source and the adjustment lens. Therefore, on one hand, the microlens array homogenizes the excitation light intensity distribution on the phosphor, but on the other hand, it is difficult to reduce the size the dichroic mirror. It is therefore difficult to suppress the decrease in the excitation light utilization efficiency in the light source apparatuses disclosed in JP-A-2017-194523 and JP-A-2019-8193.

SUMMARY

To solve the problem described above, an illuminator according to an aspect of the present disclosure includes a first light emitter that outputs first light that belongs to a first wavelength band, a first parallelizer that parallelizes the first light outputted from the first light emitter, a wavelength converter that includes a wavelength conversion layer having a first surface on which the first light is incident and a second surface different from the first surface and converts the first light into second light that belongs to a second wavelength band different from the first wavelength band, an optical element that reflects one of light that belongs to the first wavelength band and light that belongs to the second wavelength band and transmits another of the light that belongs to the first wavelength band and the light that belongs to the second wavelength band, a first focusing system that is provided between the first parallelizer and the optical element and has positive power, a diffuser that is provided between the first focusing system and the optical element and diffuses the first light that exits out of the first focusing system, and a second focusing system that is provided between the optical element and the wavelength converter and has positive power, and the second focusing system has a focal point located between a principal point of the second focusing system and the second surface of the wavelength conversion layer.

A projector according to another aspect of the present disclosure includes the illuminator according to the aspect of the present disclosure, a light modulator that modulates light from the illuminator in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 14.

In the following drawings, components are drawn at different dimensional scales in some cases for clarification of each of the components.

An example of a projector according to the present embodiment will be described.

Figure 1:
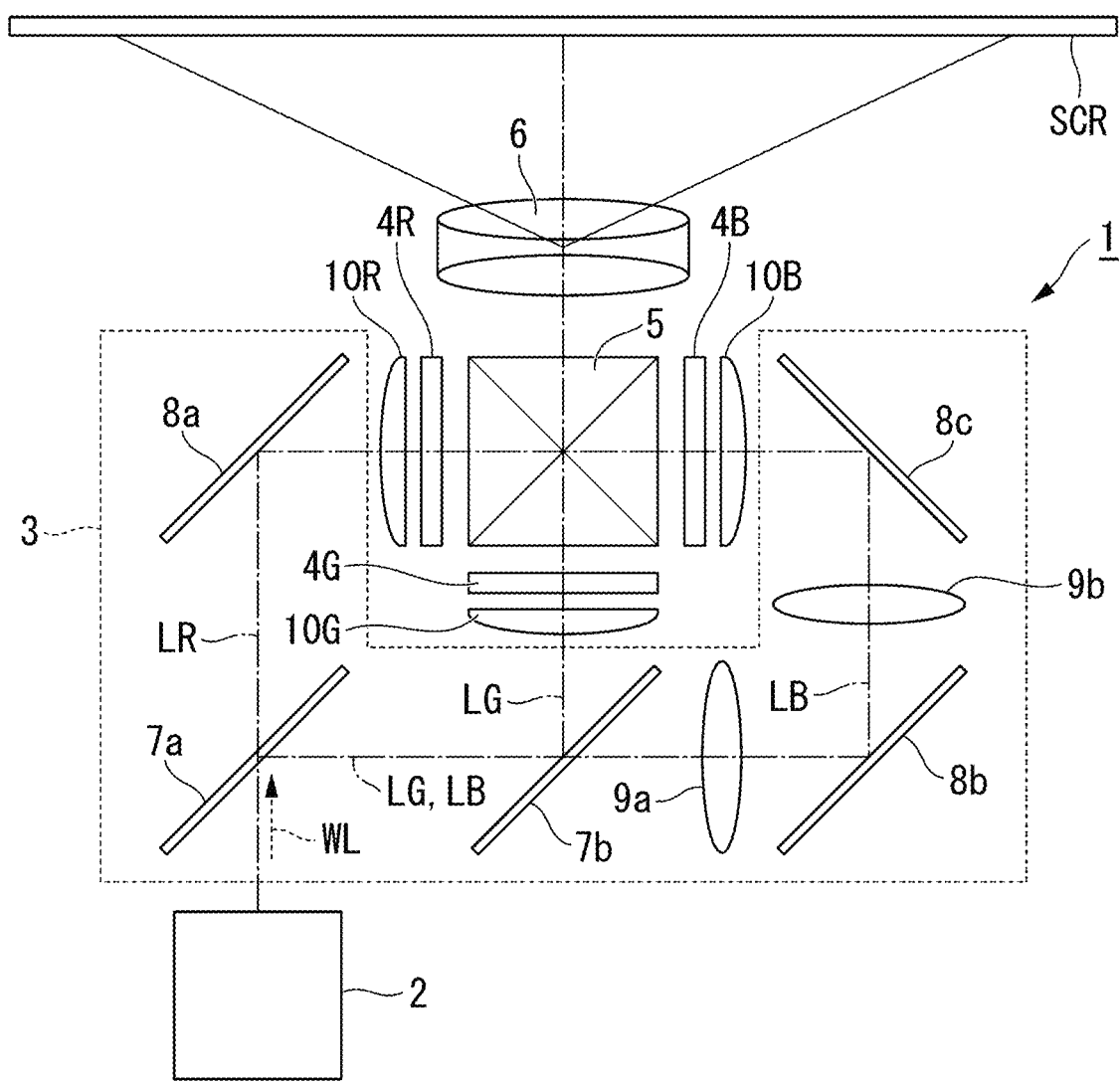
FIG. 1 is a schematic configuration diagram of a projector according to a first embodiment.

FIG. 1 is a schematic configuration diagram of the projector according to the present embodiment.

The projector 1 according to the present embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection optical apparatus 6. The configuration of the illuminator 2 will be described later.

The color separation system 3 includes a first dichroic mirror 7a, a second dichroic mirror 7b, a reflection mirror 8a, a reflection mirror 8b, a reflection mirror 8c, a relay lens 9a, and a relay lens 9b. The color separation system separates illumination light WL outputted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes incident light, and causes the resultant light to exit toward the light modulator 4R. A field lens 10G is disposed between the color separation system 3 and the light modulator 4G, substantially parallelizes incident light, and causes the resultant light to exit toward the light modulator 4G. A field lens 10B is disposed between the color separation system 3 and the light modulator 4B, substantially parallelizes incident light, and causes the resultant light to exit toward the light modulator 4B.

The first dichroic mirror 7a transmits a red light component and reflects a green light component and a blue light component. The second dichroic mirror 7b reflects the green light component and transmits the blue light component. The reflection mirror 8a reflects the red light component. The reflection mirrors 8b and 8c reflect the blue light component.

The red light LR having passed through the first dichroic mirror 7a is reflected off the reflection mirror 8a, passes through the field lens 10R, and is incident on an image formation area of the light modulator 4R for red light. The green light LG reflected off the first dichroic mirror 7a is further reflected off the second dichroic mirror 7b, passes through the field lens 10G, and is incident on an image formation area of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation area of the light modulator 4B for blue light.

The light modulators 4R, 4G, and 4B each modulate the color light incident thereon in accordance with image information to form image light. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining systems combines the image light outputted from the light modulator 4R, the image light outputted from the light modulator 4G, and the image light outputted from the light modulator 4B with one another to form full-color image light. The light combining system 5 is formed of a cross dichroic prism formed of four right angled prisms bonded to each other and having a substantially square shape in a plan view. Dielectric multilayer films are formed along the substantially X-letter-shaped interfaces between the right angled prisms bonded to each other.

The image light having exited out of the light combining system 5 is enlarged and projected by the projection optical apparatus 6 to form an image on the screen SCR. That is, the projection optical apparatus 6 projects the light modulated by the light modulators 4R, 4G, and 4B. The projection optical apparatus 6 is formed of a plurality of projection lenses.

An example of the illuminator 2 according to the present embodiment will be described.

Figure 2:
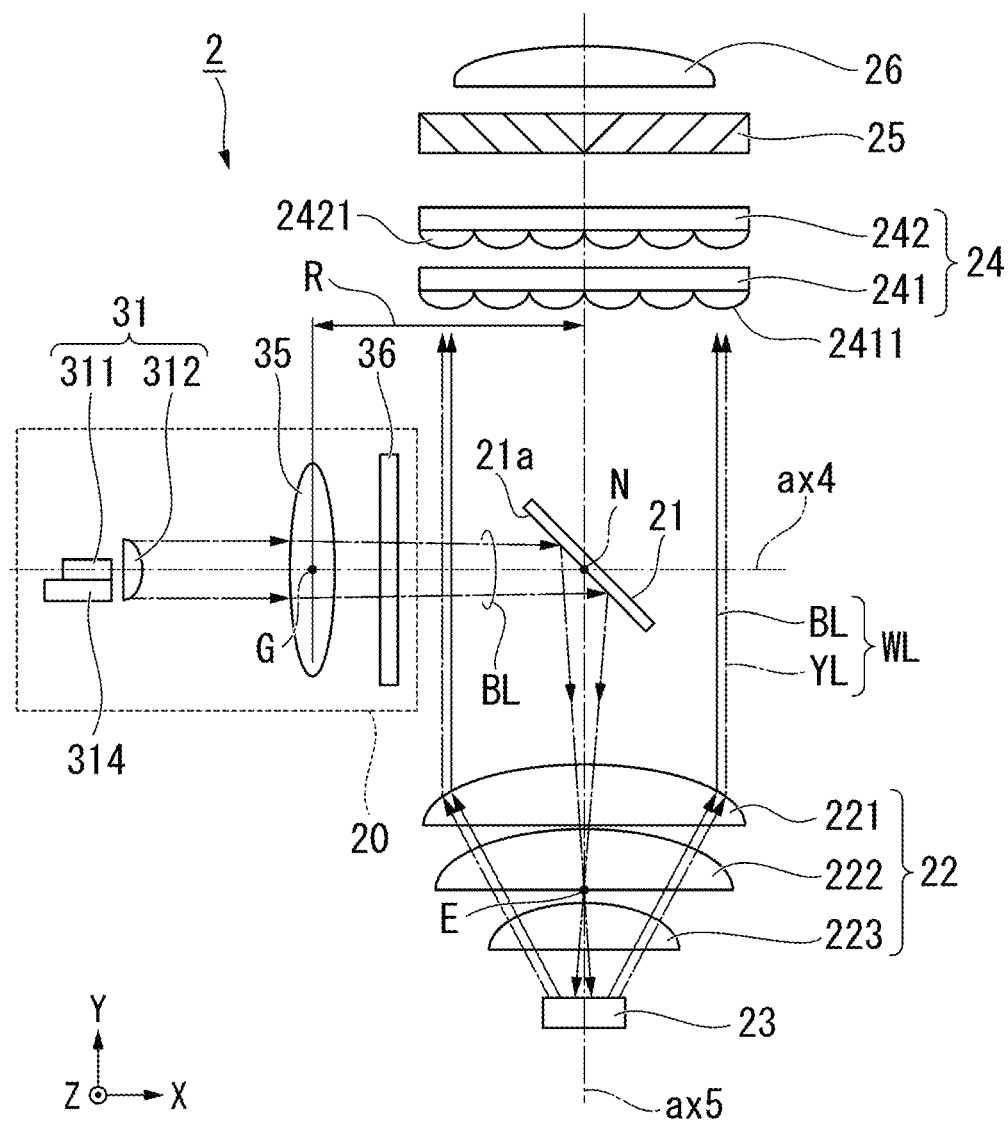
FIG. 2 is a plan view showing a schematic configuration of an illuminator according to the first embodiment.

In FIG. 2 and in the following description, an XYZ orthogonal coordinate system is used, and the axes thereof are defined as follows: An axis X is an axis parallel to the chief ray of blue light BL outputted from a light source apparatus 20; an axis Y is an axis parallel to the chief ray of fluorescence YL emitted from a wavelength converter 23; and an axis Z is an axis perpendicular to the axes X and Y.

Further, an axis along the chief ray of the blue light BL is called an optical axis ax4 of the light source apparatus 20. That is, the optical axis ax4 of the light source apparatus 20 is parallel to the axis X. The axis along the chief ray of the fluorescence YL is called an optical axis ax5 of the wavelength converter 23. That is, the optical axis ax5 of the wavelength converter 23 is parallel to the axis Y.

FIG. 2 is a plan view of the illuminator 2 viewed in the axis-Z direction.

The illuminator 2 according to the present embodiment includes the light source apparatus 20, a dichroic mirror 21 (optical element), a second focusing system 22, the wavelength converter 23, and an optical integration system 24, a polarization converter 25, and a superimposing lens 26, as shown in FIG. 2. The light source apparatus 20 includes a first light emitter 311, a first parallelizer 312, a first focusing system 35, and a diffuser 36.

The first light emitter 311 is formed of a blue semiconductor laser and outputs blue the light BL, which belongs to a first wavelength band. The blue semiconductor laser outputs the blue light BL, which belongs, for example, to a first wavelength band having a peak wavelength that falls within a range from 380 to 495 nm. The blue light BL in the present embodiment corresponds to the first light in the appended claims. The first light emitter 311 is mounted on a base 314.

Figure 3:
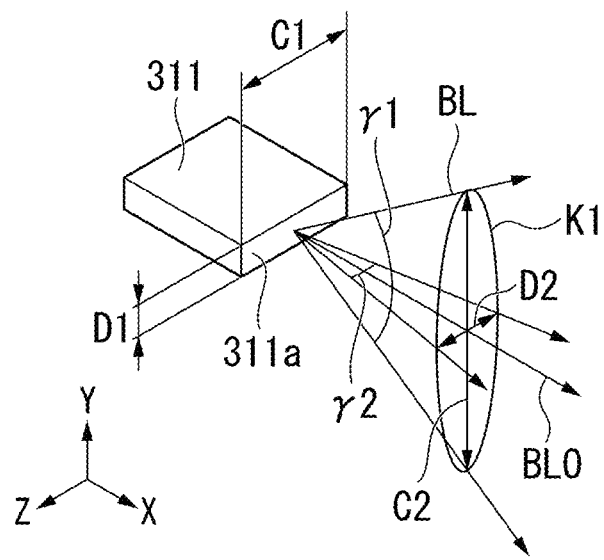
FIG. 3 is a perspective view of a first light emitter.

FIG. 3 is a perspective view of the first light emitter 311. In FIG. 3, the base 314 shown in FIG. 2 is omitted.

The first light emitter 311 has a light exiting surface 311a and outputs the blue light BL via the light exiting surface 311a in the direction +X, as shown in FIG. 3. The first light emitter 311 outputs the blue light BL having an elliptical cross-sectional shape perpendicular to a chief ray BL0. That is, a cross section of the blue light BL outputted from the first light emitter 311 that is the cross section perpendicular to the chief ray BL0 has an elliptical shape. A lengthwise direction C1 of an oblong shape that is the shape of the light exiting surface 311a coincides with a minor axis direction D2 of an elliptical shape that is the shape of a cross section K1. A widthwise direction D1 of the oblong shape that is the shape of the light exiting surface 311a coincides with a major axis direction C2 of the elliptical shape that is the shape of the cross section K1. The reason for this is that the blue light BL outputted from the first light emitter 311 diverges as follows: An angle of divergence γ1 in a plane perpendicular to the lengthwise direction of the light exiting surface 311a is greater than an angle of divergence γ2 in a plane perpendicular to the widthwise direction of the light exiting surface 311a. The maximum value of the angle of divergence γ1 (maximum radiation angle) of the blue light BL is, for example, about 70°, and the maximum value of the angle of divergence γ2 (maximum radiation angle) of the blue light BL is, for example, about 20°.

The first parallelizer 312 is provided in correspondence with the first light emitter 311, as shown in FIG. 2. The first parallelizer 312 is formed of a collimator lens formed of a convex lens. The first parallelizer 312 parallelizes the blue light BL outputted from the first light emitter 311.

The first focusing system 35 is provided between the first parallelizer 312 and the dichroic mirror 21. In the present embodiment, the first focusing system 35 is formed of a single convex lens. The number of lenses that form the first focusing system 35 is not limited to a specific number, the first focusing system 35 and may be formed of a plurality of lenses. The first focusing system 35 focuses the blue light BL incident thereon. The first focusing system 35 has positive power and has a focal point E between the dichroic mirror 21 and the wavelength converter 23. The focal length of the first focusing system 35 is longer than a distance R between a principal point G of the first focusing system 35 and a light incident point N, where the blue light BL is incident on the dichroic mirror 21.

The light incident point N, where the blue light BL is on the dichroic mirror 21, is defined as a point where a light incident surface 21a of the dichroic mirror 21 intersects the chief ray of the blue light BL. Further, the distance R between the principal point G of the first focusing system 35 and the light incident point N, where the blue light BL is incident on the dichroic mirror 21, is defined as the distance along the optical axis ax4, along which the chief ray of the blue light BL travels. The first focusing system 35 may be formed of a plurality of lenses. When the first focusing system 35 is formed of a plurality of lenses, the principal point G of the first focusing system 35 is defined as the principal point of the entire focusing system formed of the plurality of lenses.

The diffuser 36 is provided between the first focusing system 35 and the dichroic mirror 21. The diffuser 36 diffuses the blue light BL having exited out of the first focusing system 35 and causes the diffused blue light BL to exit toward the dichroic mirror 21. The diffuser 36 homogenizes the illuminance distribution of the blue light BL on the wavelength converter 23. The diffuser 36 is, for example, a ground glass plate made of optical glass. The diffuser 36 is a light transmissive diffuser.

The dichroic mirror 21 is so disposed as to incline by 45° with respect to the optical axes ax4 and ax5. That is, the dichroic mirror 21 is provided in the position where the dichroic mirror 21 intersects the optical axis ax5 of the wavelength converter 23. The dichroic mirror 21 is so characterized as to reflect light that belongs to a blue wavelength band and transmit light that belongs to a yellow wavelength band. The dichroic mirror 21 therefore reflects the blue light BL outputted from the light source apparatus and transmits the fluorescence YL emitted from the wavelength converter 23. The dichroic mirror 21 in the present embodiment corresponds to the optical element in the appended claims.

The second focusing system 22 is provided between the dichroic mirror 21 and the wavelength converter 23. The second focusing system 22 is formed of three convex lenses formed of a first lens 221, a second lens 222, and a third lens 223. The second focusing system 22 has positive power. The number of lenses that form the second focusing system 22 is not limited to a specific number. The second focusing system 22 focuses the blue light BL reflected off the dichroic mirror 21 and causes the focused blue light BL to enter the wavelength converter 23. The second focusing system 22 has a focal point located between the principal point of the second focusing system 22 and a second surface 233b of a wavelength conversion layer 233, which will be described later. In the present embodiment, since the second focusing system 22 is formed of the plurality of lenses, the principal point of the second focusing system 22 is defined as the principal point of the entire focusing system formed of the plurality of lenses. When the second focusing system 22 is formed of a single lens, the principal point of the second focusing system 22 is defined as the principal point of the single lens.

Figure 4:
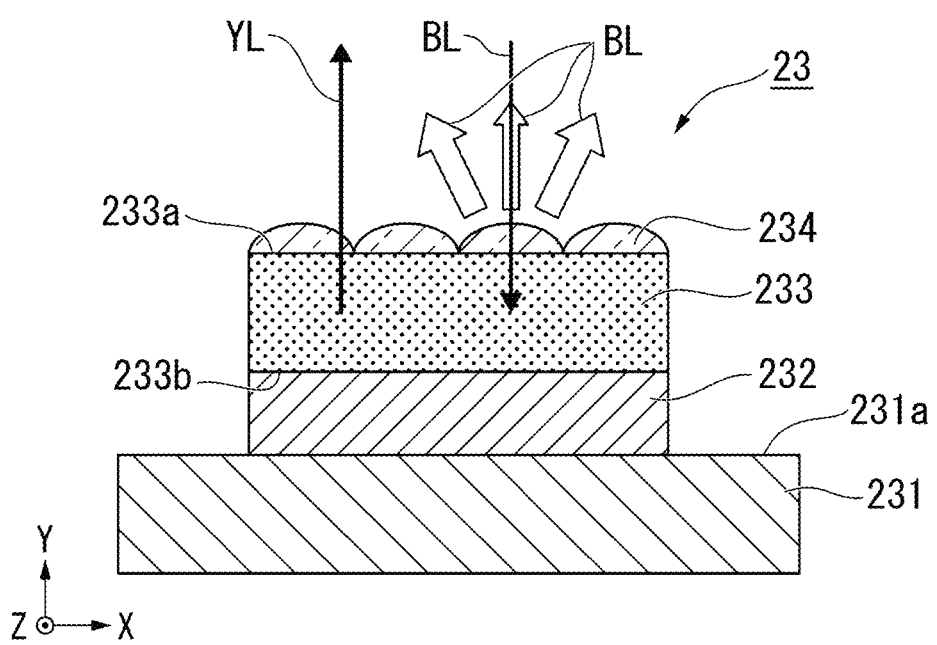
FIG. 4 is a cross-sectional view of a wavelength converter.

FIG. 4 is a cross-sectional view of the wavelength converter 23.

The wavelength converter 23 includes a substrate 231, a reflection layer 232, the wavelength conversion layer 233, and a structural element 234, as shown in FIG. 4. The wavelength conversion layer 233 has a first surface 233a, on which the blue light BL is incident, and the second surface 233b different from the first surface 233a. In the wavelength conversion layer 233, the first surface 233a and the second surface 233b face each other. The wavelength converter 23 converts the blue light BL having exited out of the second focusing system 22 into the fluorescence YL, which belongs to a second wavelength band different from the first wavelength band. The wavelength conversion layer 233 contains a ceramic phosphor that converts the blue light BL into the yellow fluorescence YL. The second wavelength band ranges, for example, from 490 to 750 nm, and the fluorescence YL is yellow light containing the green light component and the red light component. The phosphor may contain a monocrystalline phosphor. Further, the wavelength converter 23 has a substantially square planar shape when viewed in the direction in which the blue light BL is incident (axis-Y direction).

The fluorescence YL in the present embodiment corresponds to the second light in the appended claims.

The substrate 231 functions as a support substrate that supports the reflection layer 232, the wavelength conversion layer 233, and the structural element 234 and further functions as a heat dissipation substrate that dissipates heat generated in the wavelength conversion layer 233. The substrate 231 is made of a material having high thermal conductivity, such as metal and ceramic. The substrate 231 has a first surface 231a, on which the wavelength conversion layer 233 is provided.

The reflection layer 232 is provided at the first surface 231a of the substrate 231. That is, the reflection layer 232 is located between the first surface 231a of the substrate 231 and the second surface 233b of the wavelength conversion layer 233 and reflects the fluorescent YL incident from the wavelength conversion layer 233 toward the wavelength conversion layer 233. The first surface 231a of the substrate 231, at which the reflection layer 232 is provided, and the second surface 233b of the wavelength conversion layer 233 therefore face each other. The reflection layer 232 is formed, for example, of a laminated film including a dielectric multilayer film, a metal mirror, an enhanced reflection film, and other films. The reflection layer 232 may instead be formed, for example, of a multilayer film including a dielectric multilayer film, a metal mirror, an enhanced reflection film, and other films.

The wavelength conversion layer 233 contains, for example, an yttrium-aluminum-garnet-based (YAG-based) phosphor. Consider YAG:Ce, which contains cerium (Ce) as an activator, by way of example, and the YAG:Ce phosphor can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The structural element 234 is provided at the first surface 233a of the wavelength conversion layer 233. The structural element 234 scatters part of the blue light BL having entered the wavelength converter 23 and reflects the scattered blue light BL in the opposite direction from the direction in which the blue light BL is incident. The structural element 234 is made of a light transmissive material and has a plurality of scattering structures. The scattering structures in the present embodiment each have a lens shape formed of a convex portion.

The structural element 234 is formed separately from the wavelength conversion layer 233. The structural element 234 in the present embodiment is suitably formed, for example, by forming a dielectric element in a vapor deposition method, a sputtering method, a CVD method, or a coating method and then processing the dielectric element in photolithography. The structural element 234 is desirably made of a chemically stable material that absorbs light only by a small amount. That is, the structural element 234 can be made of a material having a refractive index that falls within a range from 1.3 to 2.5, for example, $SiO_2$, SiON, or $TiO_2$. For example, the structural element 234 made of $SiO_2$ can be processed with high precision by using wet etching or dry etching.

According to the configuration described above, out of the blue light BL having entered the wavelength converter 23, part of the blue light BL passes through the structural element 234 and is then converted in terms of wavelength by the wavelength conversion layer 233 into the fluorescence YL. On the other hand, the other part of the blue light BL is backscattered by the structural element 234 before converted in terms of wavelength into the fluorescence YL and is caused to exit out of the wavelength converter 23 without undergoing the wavelength conversion. In this process, the blue light BL exits out of the structural element 234 in the form of diffused light having an angular distribution that is substantially the same as the angular distribution of the fluorescence YL.

In place of the structural element 234 described above, the wavelength converter 23 may include a scattering element that scatters the blue light BL and the fluorescence YL. The scattering element is formed, for example, of a plurality of pores. In this case, out of the blue light BL having entered the wavelength converter 23, part of the blue light BL is converted in terms of wavelength into the fluorescence YL, whereas the other part of the blue light BL is backscattered by the scattering element contained in the phosphor before converted in terms of wavelength into the fluorescence YL and caused to exit out of the wavelength converter 23 without undergoing the wavelength conversion.

In the present embodiment, since the first focusing system 35 having positive power is provided between the first light emitter 311 and the dichroic mirror 21, as shown in FIG. 2, the blue light BL is incident on the dichroic mirror 21 in the form of convergent blue light BL. The size of the dichroic mirror 21 can therefore be reduced as compared with a case where no first focusing system 35 is provided. Since the dichroic mirror 21 is so characterized as to transmit a yellow light component, the fluorescence YL emitted from the wavelength converter 23 passes through the second focusing system 22 and then passes through the dichroic mirror 21.

When the size of the dichroic mirror 21 is reduced, a central portion of the blue light BL having exited out of the wavelength converter 23 is incident on the dichroic mirror 21, but a periphery portion of the blue light BL is not incident on the dichroic mirror 21 but passes through the space outside the dichroic mirror 21. The blue light BL incident on the dichroic mirror 21 is reflected off the dichroic mirror 21 and lost, but the bule light BL that is not incident on the dichroic mirror 21 along with the fluorescence YL is used as the illumination light WL. In this case, reducing the size of the dichroic mirror 21 can reduce the amount of blue light BL reflected off the dichroic mirror 21 and lost.

The blue light BL and the fluorescence YL thus enter the optical integration system 24. The blue light BL and the yellow fluorescence YL are combined with each other to produce the white illumination light WL.

The optical integration system 24 includes a first multi-lens array 241 and a second multi-lens array 242. The first multi-lens array 241 includes a plurality of first lenses 2411, which divide the illumination light WL into a plurality of sub-luminous fluxes.

The lens surface of the first multi-lens array 241, that is, the surfaces of the first lenses 2411 are conjugate with the image formation area of each of the light modulators 4R, 4G, and 4B. Therefore, when viewed in the direction of the optical axis ax5, the first lenses 2411 each have a rectangular shape substantially similar to the shape of the image formation area of each of the light modulators 4R, 4G, and 4B. The sub-luminous fluxes having exited out of the first multi-lens array 241 are thus each efficiently incident on the image formation area of each of the light modulators 4R, 4G, and 4B.

The second multi-lens array 242 includes a plurality of second lenses 2421 corresponding to the plurality of first lenses 2411 in the first multi-lens array 241. The second multi-lens array 242 along with the superimposing lens 26 brings images of the first lenses 2411 of the first multi-lens array 241 into focus in the vicinity of the image formation area of each of the light modulators 4R, 4G, and 4B.

The illumination light WL having passed through the optical integration system 24 enters the polarization converter 25. The polarization converter 25 has a configuration in which polarization separation films and retardation films that are not shown are arranged in an array. The polarization converter 25 aligns the polarization directions of the illumination light WL with a predetermined direction. Specifically, the polarization converter 25 aligns the polarization directions of the illumination light WL with the direction of the transmission axis of the light-incident-side polarizers for the light modulators 4R, 4G, and 4B.

The polarization directions of the red light LR, the green light LG, and the blue light LB separated from the illumination light WL having passed through the polarization converter 25 coincide with the transmission axis direction of the light-incident-side polarizers for the light modulators 4R, 4G, and 4B. The red light LR, the green light LG, and the blue light LB are therefore incident on the image formation areas of the light modulators 4R, 4G, and 4B, respectively, without being blocked by the light-incident-side polarizers.

The illumination light WL having passed through the polarization converter 25 enters the superimposing lens 26. The superimposing lens 26, in cooperation with the optical integration system 24, homogenizes the illuminance distribution in the image formation area of each of the light modulators 4R, 4G, and 4B, which are illumination receiving areas.

Principle of Present Embodiment

The principle that allows the configuration in the present embodiment to form an image of the blue light BL having small optical density on the wavelength converter 23 will be described.

Figure 9:
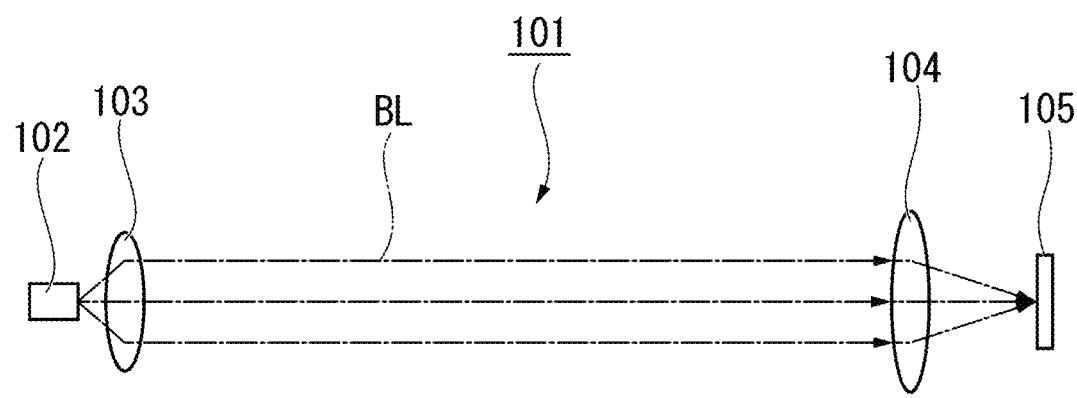
FIG. 9 is a schematic configuration diagram of an illuminator according to Comparative Example 1.

First, to examine the effect and advantage of the first focusing system 35 in the present embodiment, an illuminator according to Comparative Example 1 shown in FIG. 9 is considered.

An illuminator 101 according to Comparative Example 1 includes a light emitter 102, a parallelizer 103, a second focusing system 104, and a wavelength converter 105 but includes no first focusing system. The light emitter 102 and the wavelength converter 105 are conjugate with each other.

In the illuminator 101 according to Comparative Example 1, the blue light BL outputted from the light emitter 102 and parallelized by the parallelizer 103 is brought by the second focusing system 104 into focus on the wavelength converter 105. In this process, since the light emitter 102 and the wavelength converter 105 are conjugate with each other, the image of the blue light BL formed on the wavelength converter 105 is a diffraction-limited, extremely small point-shaped image. In the case of such a small image, the optical energy concentrates in an extremely small area on the wavelength converter 105, resulting in extremely high optical density. When high-optical-density light is incident on the wavelength converter 105, high-density heat is generated by the wavelength conversion in the phosphor. That is, the heat generated by the wavelength conversion in the phosphor concentrates at a predetermined location on the wavelength converter 105. As a result, the wavelength conversion efficiency is lowered, and the phosphor can be damaged or broken. The illuminator 101 according to Comparative Example 1 has the problem described above.

In view of the problem described above, to suppress the decrease in the wavelength conversion efficiency and the deterioration of the phosphor, the optical density on the wavelength converter 23 needs to be lowered by using the combination of the first focusing system 35 and the diffuser 36 in the present embodiment. Instead, the optical density on the wavelength converter 23 needs to be lowered by using a homogenizer in related art.

Figure 5:
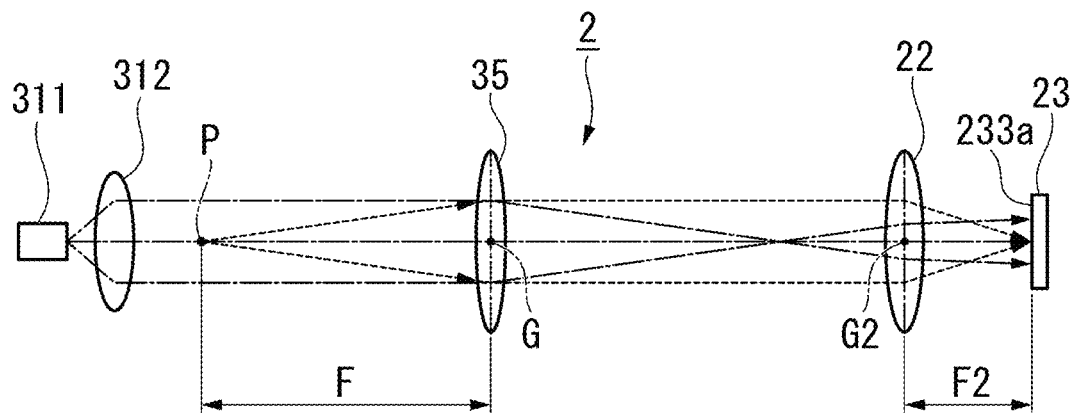
FIG. 5 is a schematic diagram for describing an effect of a first focusing system.

FIG. 5 shows a schematic configuration of the illuminator 2 according to the present embodiment. In FIG. 5, to describe the effect of the first focusing system 35 in an easy-to-understand manner, the dichroic mirror 21 and the diffuser 36 are omitted, and the second focusing system 22 is drawn in the form of a single lens.

The illuminator 2 according to the present embodiment includes the first light emitter 311, the first parallelizer 312, the first focusing system 35, the second focusing system 22, and the wavelength converter 23, as shown in FIG. 5. In the configuration described above, since the first focusing system 35 has positive power, a point P conjugate with the wavelength converter 23 is shifted from the position of the light emitter 102 in Comparative Example 1 shown in FIG. 9 to a position between the first parallelizer 312 and the first focusing system 35. The image of the blue light BL formed on the wavelength converter 23 therefore coincides with the cross-sectional shape of the blue light BL after parallelized by the first parallelizer 312.

The size of the image of the blue light BL is the luminous flux width of the blue light BL after parallelized by the first parallelizer 312 multiplied by lateral magnification $\beta$ (=F2/F), where F is the focal length of the first focusing system 35, and F2 is the focal length of the second focusing system 22, that is, the distance between a principal point G2 of the second focusing system 22 and the first surface 233a of the wavelength converter 23.

Figure 6:
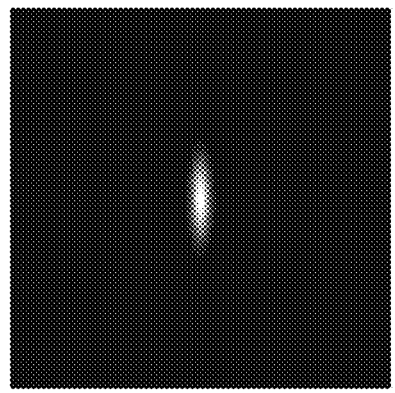
FIG. 6 shows an image of excitation light on the wavelength converter in the configuration in FIG. 5.

FIG. 6 shows the result of a simulation of the image of the blue light BL on the wavelength converter 23 in the configuration shown in FIG. 5. In FIG. 6, the white portion is a high optical intensity portion.

The image of the blue light BL on the wavelength converter 23 is an elliptical image that is sufficiently larger than the image in Comparative Example 1 having a size close to the size of a diffraction-limited image, as shown in FIG. 6. The optical density on the wavelength converter 23 is therefore greatly lower than the optical density in Comparative Example 1.

To lower the optical density on the wavelength converter 23, it is conceivable to employ a homogenizer as described above in place of the first focusing system 35 and the diffuser 36 used in the present embodiment. To examine the difference between the configuration in the present embodiment and a homogenizer, an illuminator according to Comparative Example 2 shown in FIG. 10 is considered.

Figure 10:
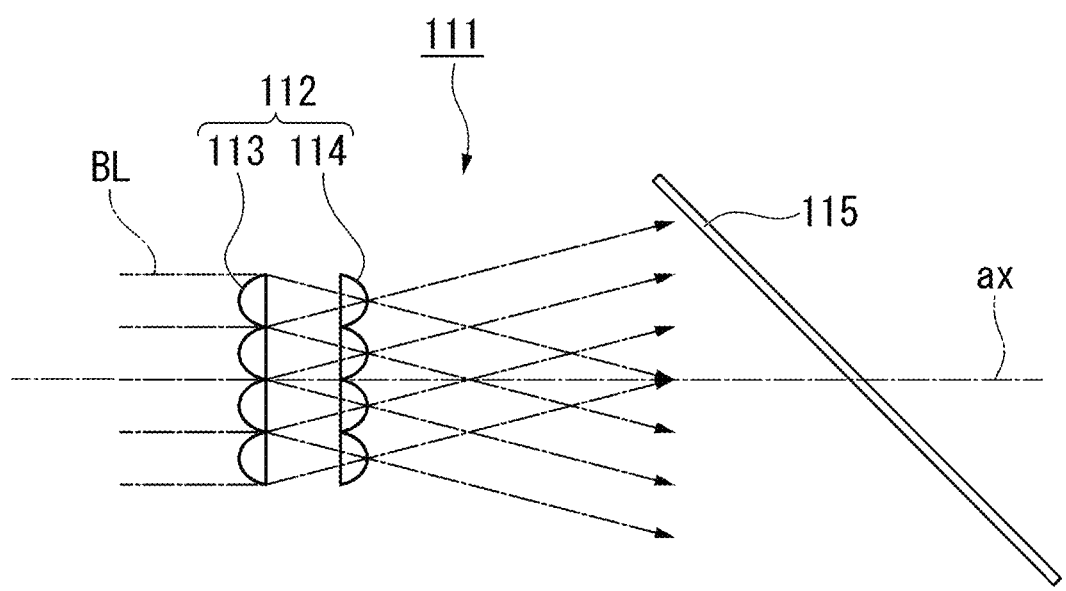
FIG. 10 is a schematic configuration diagram of key portions of an illuminator according to Comparative Example 2.

In an illuminator 111 according to Comparative Example 2, a homogenizer 112 includes a first lens array 113 and a second lens array 114, as shown in FIG. 10. The thus configured homogenizer 112 formed of the two lens arrays are used; the first lens array 113 divides the incident blue light BL into a plurality of luminous fluxes, and the second lens array 114 then superimposes the plurality of luminous fluxes on one another on the wavelength converter to homogenize the optical density on the wavelength converter.

When the homogenizer 112 is used, however, the power of the first lens array 113 causes the blue light BL having passed through the homogenizer 112 to travel while spreading in the direction away from the optical axis ax. The blue light BL having passed through the homogenizer 112 therefore has a large luminous flux width before reaching a dichroic mirror 115, inevitably resulting in an increase in the size of the dichroic mirror 115.

Figure 7:
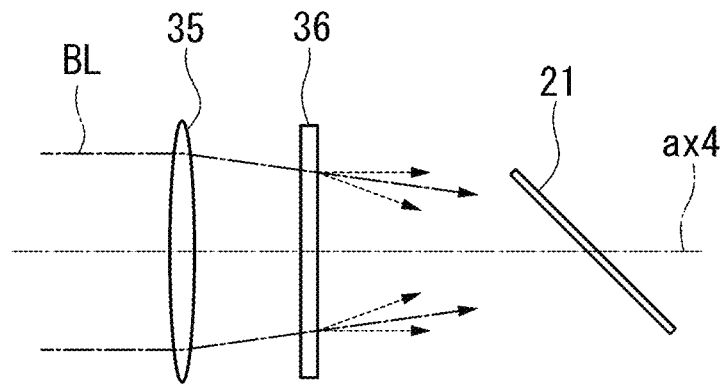
FIG. 7 is a diagrammatic view for describing an effect of a diffuser.

On the other hand, in the illuminator 2 according to the present embodiment, which is provided with the first focusing system 35, out of the blue light BL that enters the first focusing system 35, the light rays away from the optical axis ax4 and passing through the outer edge of the first focusing system 35 can be so refracted as to approach the optical axis ax4, as shown in FIG. 7. Since the focal length of the first focusing system 35 can be longer than the focal length of the first lens array 113 in the homogenizer 112 in FIG. 10, the first focusing system 35 can be so designed that the blue light BL does not spread before incident on the dichroic mirror 21.

Further, the diffuser 36 is provided between the first focusing system 35 and the dichroic mirror 21. The blue light BL that is converted by the first focusing optical system 35 into convergent blue light BL diffuses after passing through the diffuser 36 and tends to spread in the direction away from the optical axis ax4. The amount of spread of the blue light BL on the dichroic mirror 21 can be controlled by setting the curvature of the first focusing system 35, that is, the positive power of the first focusing system 35 and the angle of diffusion achieved by the diffuser 36 at predetermined values. The size of the dichroic mirror 21 can thus be reduced. Optimization of the angle of diffusion achieved by the diffuser 36 will be described later in detail.

Figure 8:
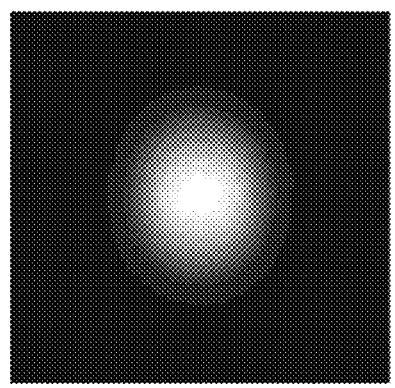
FIG. 8 shows an image of the excitation light on the wavelength converter in the configuration in FIG. 5 to which the diffuser is added.

FIG. 8 shows the result of the simulation of the image of the blue light BL on the wavelength converter 23 in the configuration in the present embodiment. In FIG. 8, the white portion is a high optical intensity portion.

The image of the blue light BL on the wavelength converter 23 is, as shown in FIG. 8, a substantially circular image that greatly spreads as compared with the image in FIG. 6, which is produced by the configuration including no diffuser 36. Adding the diffuser 36 therefore greatly lowers the optical density on the wavelength converter 23.

When the first focusing system 35 and the diffuser 36 are used, two arrangements are conceivable depending on which of the components is disposed closer to the dichroic mirror 21.

To examine the difference in effect and advantage between the two arrangements, an illuminator according to Comparison Example 3 is considered, in which the diffuser and the first focusing system are arranged in this order from the side facing the light emitter toward the dichroic mirror, contrary to the arrangement in the present embodiment. The illuminator according to Comparative Example 3 is not shown. In the light source apparatus described in JP-A-2019-8193 described above, the microlens array and the adjustment lens are arranged in this order from the side facing the light emitter toward the dichroic mirror, and the microlens array diffuses the blue light. Since the light source apparatus described in JP-A-2019-8193 thus corresponds to the illuminator according to Comparative Example 3, the light source apparatus described in JP-A-2019-8193 will be described by way of example below as the illuminator according to Comparative Example 3.

In the light source apparatus described in JP-A-2019-8193, the blue light outputted from the light emitter is so diffused by the microlens array as to spread in the direction away from the optical axis and then enters the adjustment lens. It is therefore necessary to increase the diameter of the adjustment lens, and it is necessary to increase the size of the dichroic mirror in association with the increase in the size of the adjustment lens. Therefore, in the light source apparatus described in JP-A-2019-8193, the microlens array homogenizes the intensity distribution on the wavelength converter on one hand, but it is difficult to reduce the size of the dichroic mirror on the other hand.

In contrast, in the illuminator 2 according to the present embodiment, the first focusing system 35 and the diffuser 36 are arranged in this order from the side facing the first light emitter 311 toward the dichroic mirror 21, so that the diffuser 36 is closer to the dichroic mirror 21 than the first focusing system 35. The blue light BL is therefore incident on the dichroic mirror 21 before the diffuser 36 greatly spreads the blue light BL. The illuminator 2 according to the present embodiment therefore readily reduces the size of the dichroic mirror 21 as compared with the light source apparatus described in JP-A-2019-8193.

The present inventor then examined preferable conditions that allows reduction in the size of the dichroic mirror 21.

Figure 11:
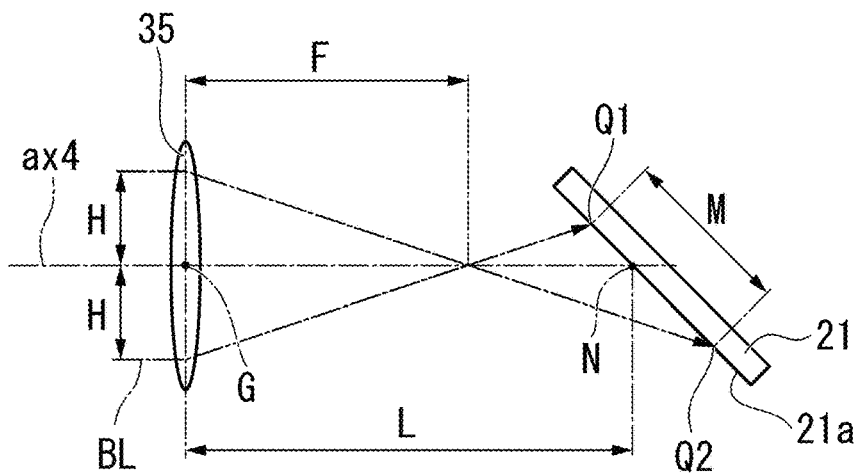
FIG. 11 describes the relationship between the focal length of the first focusing system and the size of an optical element in the illuminator according to the first embodiment.

FIG. 11 describes the relationship between the focal length of the first focusing system 35 and the size of the dichroic mirror 21 in the illuminator 2 according to the present embodiment.

Let H be the distance from the optical axis 4 to the light ray passing through each outermost point of the first focusing system 35 out of the blue light BL that enters the first focusing system 35, that is, half of the luminous flux width of the blue light BL that enters the first focusing system 35, as shown in FIG. 11. In the following description, the light ray passing through each outermost point of the first focusing system 35 out of the blue light BL is referred to as an outermost light ray, and the distance H from the optical axis to the outermost light ray of the blue light BL is referred to as a luminous flux height H. Further, let F be the focal length of the first focusing system 35. Further, let L be the distance in the direction along the optical axis ax4 from the principal point G of the first focusing system 35 to the light incident point N, where the blue light BL is incident on the dichroic mirror 21. The distance L is hereinafter referred to as a distance L between the first focusing system and the mirror. Further, let M be the distance in the direction along the light incident surface 21a between a light incident point Q1, where one of the outermost light rays is incident on the dichroic mirror 21, and a light incident point Q2, where the other outermost light ray is incident on the dichroic mirror 21. The distance M is hereinafter referred to as a light incident width M.

In order for all the light rays of the blue light BL to be reflected off the dichroic mirror 21, the size of the dichroic mirror 21 needs to be greater than or equal to the light incident width M. The actual size of the dichroic mirror 21 is, however, desirably the light incident width M to which a margin is added in consideration of variation in the angle of diffusion achieved by the diffuser 36 and errors of the positions where a variety of optical elements are placed, and other factors. The light incident width M depends on the luminous flux height H, the focal length F, and the distance L between the first focusing system and the mirror shown in FIG. 11.

Figure 12:
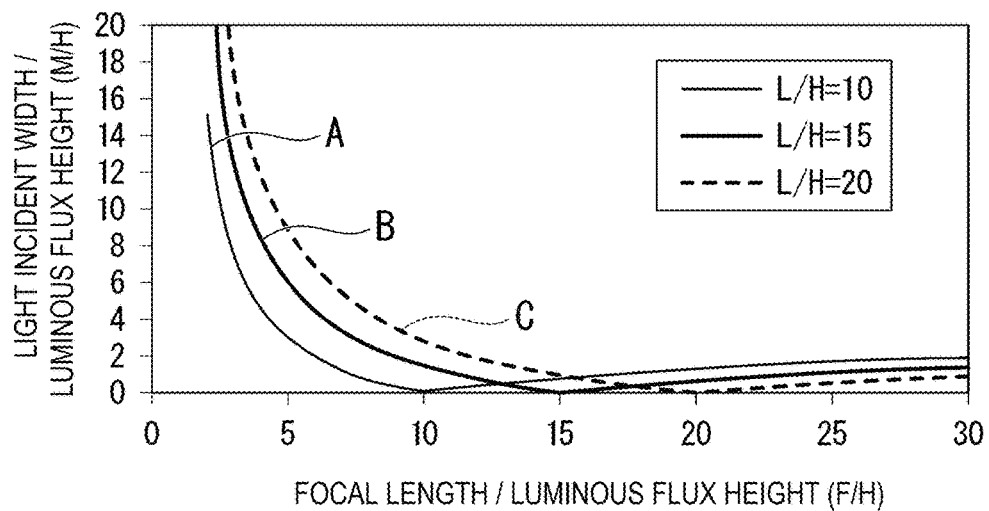
FIG. 12 show graphs illustrating the relationship between the focal length of the first focusing system and a light incident width on the optical element.

In view of the fact described above, the present inventor calculated the light incident width M by changing as appropriate the luminous flux height H, the focal length F, and the distance L between the first focusing system and the mirror. FIG. 12 shows the results of the calculation.

The values of F, L, and M shown in FIG. 12 are normalized by the value of H.

The horizontal axis of FIG. 12 represents the focal length/the luminous flux height (F/H). The vertical axis of FIG. 12 represents the light incident width/the luminous flux height (M/H). The graph A shows a case where the distance between the first focusing system and the mirror/the luminous flux height L/H is 10. The graph B shows a case where the distance between the first focusing system and the mirror/the luminous flux height L/H is 15. The graph C shows a case where the distance between the first focusing system and the mirror/the luminous flux height L/H is 20.

In FIG. 12, when L/H=F/H, that is, when L=F, the blue light BL is brought into focus on the dichroic mirror 21, so that M=0 or the light incident width M is minimized. However, when L=F is not satisfied, the light incident width M changes differently depending on how L=F is not satisfied. Specifically, when L>F, that is, the focal length F changes so as to be smaller than the distance L between the first focusing system and the mirror (leftward along the horizontal axis of FIG. 12), the light incident width M tends to abruptly increase. Therefore, in this case, it is necessary to increase the size of the dichroic mirror 21. On the other hand, when L<F, that is, the focal length F changes so as to be greater than the distance L between the first focusing system and the mirror (rightward along the horizontal axis in FIG. 12), the light incident width M tends not to greatly increase. Therefore, in this case, it is not necessary to greatly increase the size of the dichroic mirror 21.

Therefore, when the distance L between the first focusing system and the mirror and the focal length F satisfy Expression (1) below, the size of the dichroic mirror 21 can be reduced, and the increase in the size of the dichroic mirror 21 can be minimized even in consideration of manufacturing and assembly errors of a variety of optical elements and other factors.

$$L \leq F \quad (1)$$

The present inventor then examined preferable conditions for the angle of diffusion achieved by the diffuser 36.

Figure 13:
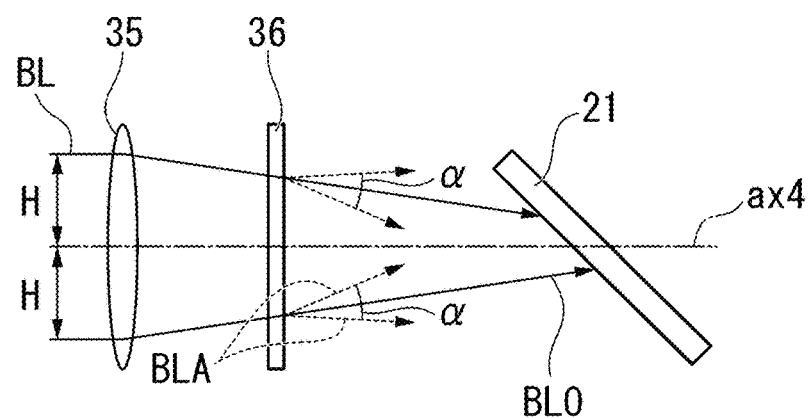
FIG. 13 is a diagrammatic view showing the angle of diffusion achieved by a diffuser.

FIG. 13 is a diagrammatic view showing the angle of diffusion achieved by the diffuser 36.

The blue light BL so refracted by the first focusing system 35 as to approach the optical axis ax4 is diffused when passing through the diffuser 36, as shown in FIG. 13. Assuming that a chief ray BL0, which exits along the extension of the incident direction, out of the blue light BL having exited out of the diffuser 36 has an intensity of 1, the angle between two light rays BLA, which are located outside the chief ray BL0 and have an intensity of 0.5, is defined as an angle of diffusion α (rad).

Further assuming that the first focusing system 35 has a sufficiently long focal length, and that the blue light BL enters the diffuser 36 at an angle so close that the blue light BL is parallel to the optical axis ax4, the blue light BL having passed through the diffuser 36 spreads at the angle of diffusion α in the direction away from the optical axis ax4, so that the size of the dichroic mirror 21 needs to be increased. Therefore, to avoid an increase in the size of the dichroic mirror 21, the diffuser 36 needs to achieve an angle of diffusion α that causes the blue light BL having passed through the diffuser 36 to travel in the direction parallel to the optical axis ax4 or in a direction in which the blue light BL approaches the optical axis ax4.

Figure 14:
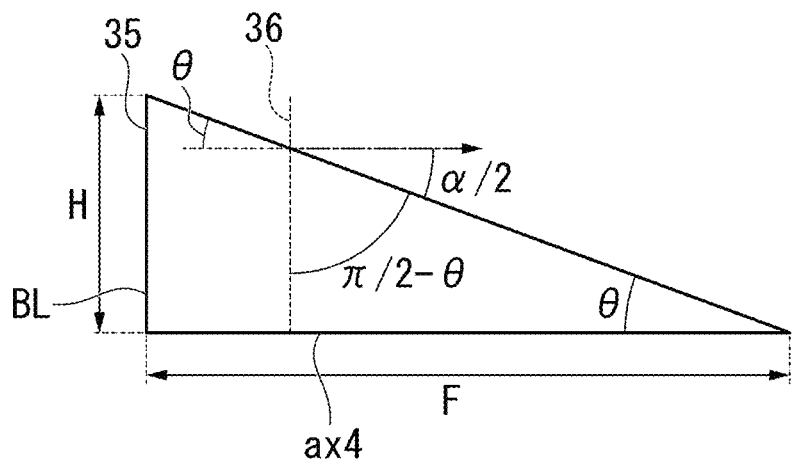
FIG. 14 describes derivation of a mathematical formula for determining an optimum angle of diffusion.

FIG. 14 describes derivation of a mathematical formula for determining an optimum angle of diffusion. In FIG. 14, the first focusing system 35 and the diffuser 36 are diagrammatically drawn with straight lines.

Let e be the angle of incidence of the blue light BL incident on the diffuser 36, as shown in FIG. 14. Expression (3) below shows the condition under which a light ray that exits out of the diffuser 36 travels in the direction parallel to the optical axis ax4 or in a direction in which the light ray approaches the optical axis ax4.

$$\pi/2 \geq (\pi/2 - \theta) + \alpha/2 \quad (3)$$

Expression (4) below is derived by deforming Expression (3).

$$\theta \geq \alpha/2 \quad (4)$$

Since the geometrical relationship does not allow e to exceed π/2, Expression (5) below is derived by adding this condition to Expression (4).

$$\pi/2 > \theta \geq \alpha/2 \quad (5)$$

Let H be the luminous flux height of the blue light BL that enters the first focusing system 35 and F be the focal length of the first focusing system 35 as described above, and the geometrical relationship derives Equation (6) below.

$$H/F = \tan \theta \quad (6)$$

Expression (7) below is therefore derived from Expressions (5) and (6).

$$H/F \geq \tan(\alpha/2) \quad (7)$$

Expression (2) below is derived by deforming Expression (7).

$$\alpha \leq 2 \cdot \tan^{-1}(H/F) \quad (2)$$

where α<Π

As shown above, setting the angle of diffusion α achieved by the diffuser 36 so as to satisfy Expression (2) described above allows suppression of the spread of the blue light BL having passed through the diffuser 36 in the direction away from the optical axis ax4. The size of the dichroic mirror 21 can thus be more reliably reduced.

Effects of First Embodiment

The illuminator 2 according to the present embodiment includes the first light emitter 311, which outputs the blue light BL, the first parallelizer 312, which parallelizes the blue light BL outputted from the first light emitter 311, the wavelength converter 23, which includes the wavelength conversion layer 233 having the first surface 233a, on which the blue light BL is incident, and the second surface 233b different from the first surface 233a and converts the blue light BL into the yellow fluorescent YL, the dichroic mirror 21, which reflects one of the blue light BL and the fluorescent YL and transmits the other, the first focusing system 35, which is provided between the first parallelizer 312 and the dichroic mirror 21 and has positive power, the diffuser 36, which is provided between the first focusing system 35 and the dichroic mirror 21 and diffuses the blue light BL having exited out of the first focusing system 35, and the second focusing system 22, which is provided between the dichroic mirror 21 and the wavelength converter 23 and has positive power, and the second focusing system 22 has a focal point located between the principal point of the second focusing system 22 and the second surface 233b of the wavelength conversion layer 233.

According to the illuminator 2 having the configuration described above, reducing the size of the dichroic mirror 21 can reduce the amount of blue light BL reflected off the dichroic mirror 21 and is therefore lost, whereby the efficiency of utilization of the blue light BL can be increased. Further, since the optical density of the blue light BL on the wavelength converter 23 can be lowered, the wavelength conversion efficiency can be increased, and damage or breakage to the wavelength converter 23 can be suppressed. An illuminator 2 that provides high efficiency of utilization of the blue light BL and excels in the wavelength conversion efficiency and reliability can thus be achieved.

Further, the illuminator 2 according to the present embodiment satisfies Expression (1) below, $$L \leq F \quad (1)$$

where F is the focal length of the first focusing system 35, and L is the distance in the direction along the optical axis ax4 from the principal point G of the first focusing system 35 to the light incident point N, where the blue light BL is incident on the dichroic mirror 21.

According to the configuration described above, an increase in the size of the dichroic mirror 21 can be minimized even in consideration of manufacturing and assembly errors of a variety of optical elements and other factors.

The illuminator 2 according to the pr 2 esent embodiment satisfies Expression (2) below, where F is the focal length of the first focusing system 35, H is the luminous flux height of the blue light BL that enters the first focusing system 35, and α (rad) is the angle of diffusion achieved by the diffuser 36.

$$\alpha \leq 2 \cdot \tan^{-1}(H/F) \text{(where } \alpha < \Pi) \quad (2)$$

According to the configuration described above, the size of the dichroic mirror 21 can be more reliably reduced.

In the illuminator 2 according to the present embodiment, the dichroic mirror 21 is provided in a position where the dichroic mirror 21 intersects the optical axis ax5 of the wavelength converter 23.

In an illuminator of related art, when the dichroic mirror is provided in a position where the dichroic mirror intersects the optical axis of the wavelength converter, the dichroic mirror can undesirably cause most of the blue light to return toward the first light emitter. In contrast, the illuminator 2 according to the present embodiment can minimize the amount of blue light BL that returns toward the first light emitter 311, whereby the efficiency of utilization of the blue light BL can be increased.

In the illuminator 2 according to the present embodiment, the wavelength converter 23 includes the wavelength conversion layer 233, which converts the blue light BL into the fluorescence YL, the reflection layer 232, which is provided at the first surface 233a of the wavelength conversion layer 233, and the structural element 234, which is provided at the second surface 233b of the wavelength conversion layer 233.

According to the configuration described above, part of the blue light BL before entering the wavelength conversion layer 233 can be backscattered by the structural element 234, whereby the part of the blue light BL can be effectively used as the illumination light.

The projector 1 according to the present embodiment, which includes the illuminator 2 according to the present embodiment, excels in the light utilization efficiency.

Second Embodiment

A second embodiment of the present disclosure will be described below with reference to FIGS. 15 to 17.

The configuration of the projector according to the second embodiment is the same as that in the first embodiment but differs therefrom in terms of the configuration of the light source apparatus. The overall configurations of the projector and the illuminator will therefore not be described.

Figure 15:
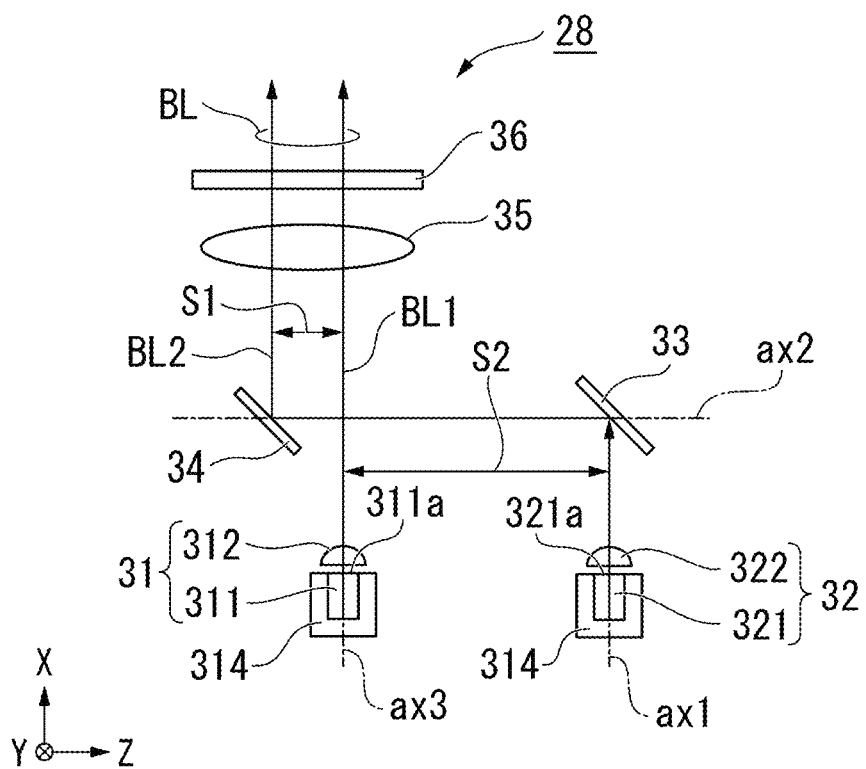
FIG. 15 is a side view of the illuminator according to a second embodiment.

FIG. 15 is a schematic configuration diagram of the light source apparatus in the second embodiment.

In FIG. 15, components common to those in the figures used in the first embodiment have the same reference characters and will not be described.

Alight source apparatus 28 in the present embodiment includes the first light emitting element 311, the first parallelizer 312, a second light emitter 321, a second parallelizer 322, a first light combining mirror 33, a second light combining mirror 34, the first focusing system 35, and the diffuser 36, as shown in FIG. 15.

The second light emitter 321 has the same configuration as that of the first light emitter 311 described in the first embodiment. That is, the second light emitter 321 is formed of a blue semiconductor laser that outputs blue light BL2. The blue semiconductor laser outputs the blue light BL2 having a peak wavelength that falls within, for example, the range from 380 to 495 nm. The first light emitter 311 and the second light emitter 321 may be formed of blue semiconductor lasers that output blue light having the same peak wavelength or may be formed of blue semiconductor lasers that output blue light having different peak wavelengths. The blue light BL2 along with the blue light BL1 enters the first focusing system 35. The blue light BL1 in the present embodiment corresponds to the first light in the appended claims. The blue light BL2 in the present embodiment corresponds to the third light in the appended claims.

The second parallelizer 322 is provided in correspondence with the second light emitter 321. The second parallelizer 322 parallelizes the blue light BL2 outputted from the second light emitter 321.

The first light combining mirror 33 is so disposed that the reflection surface thereof inclines by the angle of 45° with respect to an optical axis ax1 along the chief ray of the blue light BL2 outputted from the second light emitter 321. The blue light BL2 outputted from the second light emitter 321 in the direction +X is therefore then reflected off the first light combining mirror 33 and travels in the direction −Z. The second light combining mirror 34 is so disposed that the reflection surface thereof inclines by the angle of 45° with respect to an optical axis ax2 along the chief ray of the blue light BL2 reflected off the first light combining mirror 33. The blue light BL2 therefore travels from the first light combining mirror 33 in the direction −Z, is then reflected off the second light combining mirror 34, and travels along an optical axis ax3 in the direction +X.

On the other hand, the blue light BL1 outputted from the first light emitter 311 is not incident on the first light combining mirror 33 or the second light combining mirror 34 but travels straight from the first light emitter 311 along the optical axis ax3 in the direction +X. The optical path of the blue light BL2 is deflected by the first light combining mirror 33 and the second light combining mirror 34, so that a gap S1 between the blue light BL1 and the blue light BL2 in the positions after the blue light BL2 is reflected off the second light combining mirror 34 is narrower than a gap S2 between the blue light BL1 and the blue light BL2 in the positions immediately after the blue light BL1 and the blue light BL2 are outputted from the first light emitter 311 and the second light emitter 321. The blue light BL1 and the blue light BL2 are thus combined with each other by the first light combining mirror 33 and the second light combining mirror 34 into a luminous flux BL.

That is, the first light combining mirror 33 and the second light combining mirror 34 are provided between the first light emitter 311 and the dichroic mirror 21 and between the second light emitter 321 and the dichroic mirror 21, respectively, and at least one of the blue light BL1 outputted from the first light emitter 311 and the blue light BL2 outputted from the second light emitter 321 is incident on the first light combining mirror 33 and the second light combining mirror 34, which combine the blue light BL1 and the blue light BL2 with each other. The combined luminous flux BL sequentially enters the first focusing system 35 and the diffuser 36.

The other configurations of the light source apparatus 28 are the same as those of the light source apparatus 20 in the first embodiment.

Effects of Second Embodiment

The present embodiment also provides the same effects as those provided by the first embodiment, for example, an illuminator that provides high efficiency of utilization of the blue light BL and excels in the wavelength conversion efficiency and reliability can be achieved.

Further, in the present embodiment, the light source apparatus 28 includes the second light emitter 321 and the second parallelizer 322 in addition to the first light emitter 311 and the first parallelizer 312.

According to the configuration described above, the optical power of the blue light BL from the light source apparatus 28 can be increased. As a result, the optical power of the white illumination light WL outputted from the illuminator can be increased.

Figure 16:
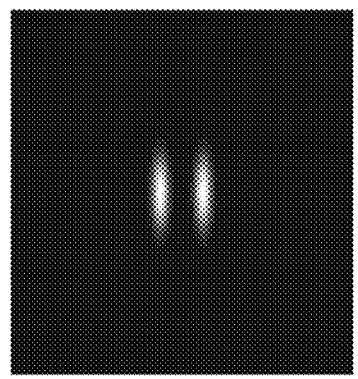
FIG. 16 shows an image of the excitation light on the wavelength converter in the configuration in FIG. 15 from which the diffuser is excluded.

FIG. 16 shows an image of the luminous flux BL on the wavelength converter 23 with the diffuser 36 excluded from the configuration in FIG. 15. In FIG. 16, the white portion is a high optical intensity portion.

In the present embodiment, the blue light BL1 outputted from the first light emitter 311 and the blue light BL2 outputted from the second light emitter 321 are arranged side by side in the minor axis direction of an ellipse that is a cross-sectional shape of each of the blue light BL1 and the blue light BL2 that is the cross-sectional shape perpendicular to the optical axis thereof, as shown in FIG. 16. A cross-section of the luminous flux BL formed of the blue light BL1 and the blue light BL2 that is the cross-section perpendicular to the optical axis of the luminous flux BL is therefore so shaped that the ratio of the dimension in the widthwise direction to the dimension in the lengthwise direction of the cross-sectional shape is close to 1:1, that is, a shape close to a circular shape or a square shape.

Figure 17:
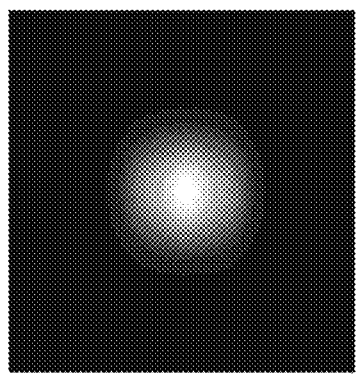
FIG. 17 shows an image of the excitation light on the wavelength converter in the configuration in FIG. 15.

FIG. 17 shows an image of the luminous flux BL on the wavelength converter 23 in the configuration in FIG. 15. In FIG. 17, the white portion is a high optical intensity portion.

When the diffuser 36 is provided, the luminous flux BL is diffused by the diffuser 36 and then enters the wavelength converter 23, so that the image of the luminous flux BL that enters the wavelength converter 23 has a substantially circulars shape, as shown in FIG. 17. As a result, the blue light BL and the fluorescent YL each having a cross-sectional shape close to a circular shape are emitted from the wavelength converter 23, whereby the illumination light WL is allowed to efficiently enter the optical system on the downstream of the wavelength converter 23. An illuminator that provides high light utilization efficiency can thus be achieved.

Third Embodiment

A third embodiment of the present disclosure will be described below with reference to FIG. 18.

The configuration of the projector according to the third embodiment is the same as that in the first embodiment but differs therefrom in terms of the configuration of the illuminator. The overall configuration of the projector will therefore not be described.

Figure 18:
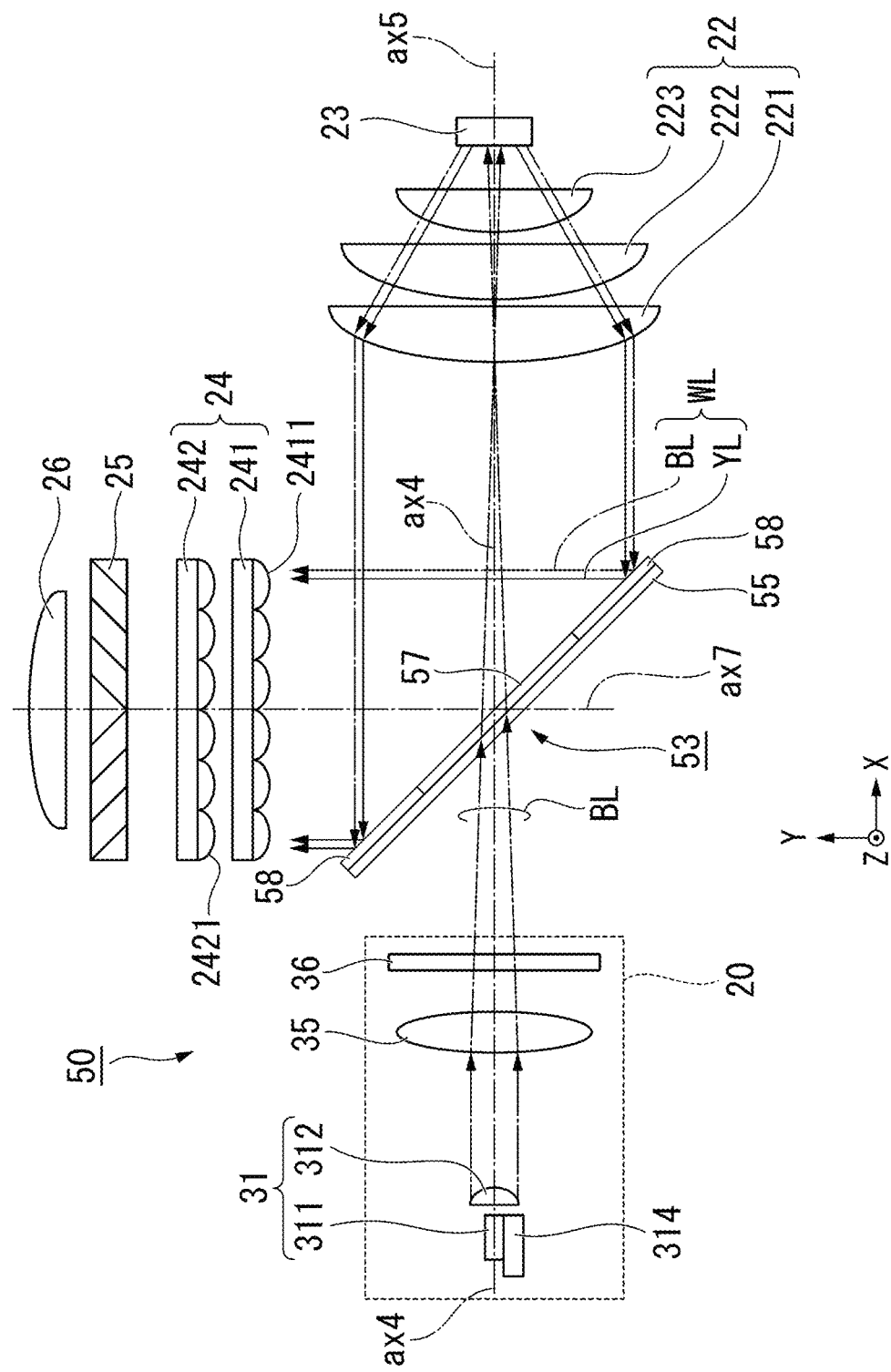
FIG. 18 is a plan view showing a schematic configuration of the illuminator according to a third embodiment.

FIG. 18 is a schematic configuration diagram of the illuminator according to the third embodiment.

In FIG. 18, components common to those in the figures used in the first embodiment have the same reference characters and will not be described.

An illuminator 50 according to the present embodiment includes the light source apparatus 20, an optical element 53, the second focusing system 22, the wavelength converter 23, the optical integration system 24, and the polarization converter 25, and the superimposing lens 26, as shown in FIG. 18. The light source apparatus 20 includes the first light emitter 311, the first parallelizer 312, the first focusing system 35, and the diffuser 36.

In the illuminator 2 according to the first embodiment, the optical axis ax4 of the light source apparatus 20 and the optical axis ax5 of the wavelength converter 23 are perpendicular to each other. In contrast, in the illuminator 50 according to the present embodiment, the optical axis ax4 of the light source apparatus 20 and the optical axis ax5 of the wavelength converter 23 are disposed along the same straight line. Therefore, in the present embodiment, the first light emitter 311, the first parallelizer 312, the first focusing system 35, the diffuser 36, the optical element 53, the second focusing system 22, and the wavelength converter 23 are arranged along the same optical axis. The optical axes ax4 and ax5 are perpendicular to an optical axis ax7 of a downstream optical system including the optical integration system 24, the polarization converter 25, and the superimposing lens 26.

The optical element 53 is so disposed as to incline by 45° with respect to each of the optical axes ax4, ax5, and ax7. The optical element 53 includes a light transmissive substrate 55 and an optical film provided on one surface of the substrate 55. A dichroic mirror 57 so characterized as to transmit light that belongs to the blue wavelength band and reflect light that belongs to the yellow wavelength band is provided as the optical film in a central portion of the optical element 53 where the optical axis ax4 and the optical axis ax5 intersect the optical axis ax7. That is, the dichroic mirror 57 in the present embodiment has a transmission wavelength band and a reflection wavelength band reversed in terms of characteristics from those of the dichroic mirror 21 in the first embodiment. A mirror 58 that reflect both the light that belongs to the blue wavelength band and the light that belongs to the yellow wavelength band is provided on opposite sides of the dichroic mirror 57.

In present embodiment, the blue light BL outputted from the first light emitter 311 passes through the dichroic mirror 57 and enters the wavelength converter 23 via the second focusing system 22. Since the first focusing system 35 and the diffuser 36 are provided between the first light emitter 311 and the optical element 53 also in the present embodiment, the size of the dichroic mirror 57 on the optical element 53 can be reduced, as in the first embodiment.

When the size of the dichroic mirror 57 is reduced, a central portion of the blue light BL backscattered by the wavelength converter 23 is incident on the dichroic mirror 57, but a peripheral portion of the blue light BL is reflected off the mirror 58 on opposite sides of the dichroic mirror 57. The blue light BL incident on the dichroic mirror 57 passes through the dichroic mirror 57 and is therefore lost, but the blue light BL incident on the mirror 58 along with the fluorescence YL is used as the illumination light WL. Further, reducing the size of the dichroic mirror 57 can reduce the amount of loss of the blue light BL passing through the dichroic mirror 57.

Effects of Third Embodiment

The present embodiment also provides the same effects as those provided by the first embodiment, for example, an illuminator 50 that provides high efficiency of utilization of the blue light BL and excels in the wavelength conversion efficiency and reliability can be achieved.

The technical scope of the present disclosure is not limited to those in the embodiments described above, and a variety of changes can be made thereto to the extent that the changes do not depart from the substance of the present disclosure.

For example, the illuminator according to the second embodiment has the configuration in which the blue light outputted from the first light emitter and the blue light outputted from the second light emitter are combined with each other by using the light combining mirrors and the combined blue light is then caused to enter the first focusing system and may instead have a configuration in which the blue light outputted from the first light emitter and the blue light outputted from the second light emitter are caused to enter in parallel the first focusing system without use of the light combining mirrors.

Further, in the embodiments described above, the dichroic mirror is provided in the position where the dichroic mirror intersects the optical axis of the wavelength converter and may instead be provided in a position offset from the optical axis of the wavelength converter.

Further, the above embodiments have been described with reference to an immobile wavelength converter configured not to be rotatable, and the present disclosure is also applicable to an illuminator including a wavelength converter configured to be rotatable by a motor. An immobile diffuser configured not to be rotatable has also been presented, and the present disclosure is also applicable to an illuminator including a diffuser configured to be rotatable by a motor.

In addition to the above, the specific descriptions of the shape, the number, the arrangement, the material, and other factors of the components of the illuminators and the projectors are not limited to those in the embodiments described above and can be changed as appropriate. The above embodiments have been described with reference to the case where the illuminators according to the present disclosure are each incorporated in a projector using liquid crystal light valves, but not necessarily. The illuminators according to the present disclosure may each be incorporated in a projector using a digital micromirror device as each of the light modulators. The projectors may not each include a plurality of light modulators and may instead include only one light modulator.

The above embodiments have been described with reference to the case where the illuminators according to the present disclosure are each incorporated in a projector, but not necessarily. The illuminators according to the present disclosure may each be used as a lighting apparatus, a headlight of an automobile, and other components.

An illuminator according to an aspect of the present disclosure may have the configuration below.

The illuminator according to the aspect of the present disclosure includes a first light emitter that outputs first light that belongs to a first wavelength band, a first parallelizer that parallelizes the first light outputted from the first light emitter, a wavelength converter that includes a wavelength conversion layer having a first surface on which the first light is incident and a second surface different from the first surface and converts the first light into second light that belongs to a second wavelength band different from the first wavelength band, an optical element that reflects one of light that belongs to the first wavelength band and light that belongs to the second wavelength band and transmits the other, a first focusing system that is provided between the first parallelizer and the optical element and has positive power, a diffuser that is provided between the first focusing system and the optical element and diffuses the first light having exited out of the first focusing system, and a second focusing system that is provided between the optical element and the wavelength converter and has positive power, and the second focusing system has a focal point located between the principal point of the second focusing system and the second surface of the wavelength conversion layer.

The illuminator according to the aspect of the present disclosure may further include a second light emitter that outputs third light that belongs to the first wavelength band and a second parallelizer that parallelizes the third light outputted from the second light emitter, and the third light having exited out of the second parallelizer may enter the first focusing system.

The illuminator according to the aspect of the present disclosure may satisfy Expression (1) below, $$L \leq F \quad (1)$$

where F is the focal length of the first focusing system, and L is the distance from the principal point of the first focusing system to the light incident point where the first light is incident on the optical element.

The illuminator according to the aspect of the present disclosure may satisfy Expression (2) below, $$\alpha \leq 2 \cdot \tan^{-1}(H/F) \text{ (where } \alpha < \Pi) \quad (2)$$

where F is the focal length of the first focusing system, H is the distance from the optical axis to an outermost light ray of the first light that enters the first focusing system, and $\alpha$ (rad) is the angle of diffusion achieved by the diffuser.

In the illuminator according to the aspect of the present disclosure, the optical element may be provided in a position where the optical element intersects the optical axis of the wavelength converter.

In the illuminator according to the aspect of the present disclosure, the wavelength converter may include a wavelength conversion layer that converts the first light into the second light, a reflection layer provided at a first surface of the wavelength conversion layer, and a structural element provided at a second surface of the wavelength conversion layer.

A projector according to another aspect of the present disclosure may have the configuration below.

The projector according to the other aspect of the present disclosure includes the illuminator according to the aspect of the present disclosure, a light modulator that modulates light from the illuminator in accordance with image information, and a projection optical apparatus that projects the light modulated by the light modulator.

What is claimed is:

1. An illuminator comprising:
   a first light emitter that outputs first light that belongs to a first wavelength band;
   a first parallelizer that parallelizes the first light outputted from the first light emitter;
   a wavelength converter that includes a wavelength conversion layer having a first surface on which the first light is incident and a second surface different from the first surface and converts the first light into second light that belongs to a second wavelength band different from the first wavelength band;
   an optical element that reflects one of light that belongs to the first wavelength band and light that belongs to the second wavelength band and transmits another of the light that belongs to the first wavelength band and the light that belongs to the second wavelength band;
   a first focusing system that is provided between the first parallelizer and the optical element and has positive power;

a diffuser that is provided between the first focusing system and the optical element and diffuses the first light that exits out of the first focusing system; and a second focusing system that is provided between the optical element and the wavelength converter and has positive power, wherein the second focusing system has a focal point located between a principal point of the second focusing system and the second surface of the wavelength conversion layer, and the illuminator satisfies Expression (1) below, $$L \leq F \qquad (1)$$

where F is a focal length of the first focusing system, and L is a distance from a principal point of the first focusing system to a light incident point where the first light is incident on the optical element.

2. The illuminator according to claim 1, further comprising:

a second light emitter that outputs third light that belongs to the first wavelength band; and a second parallelizer that parallelizes the third light outputted from the second light emitter, wherein the third light that exits out of the second parallelizer enters the first focusing system.

3. The illuminator according to claim 1, wherein the illuminator satisfies Expression (2) below, $$\alpha \leq 2 \cdot \tan^{-1}(H/F) \text{(where } \alpha < \Pi) \qquad (2)$$

where F is a focal length of the first focusing system, H is a distance from an optical axis to an outermost light ray of the first light that enters the first focusing system, and $\alpha$ (rad) is an angle of diffusion achieved by the diffuser.

4. The illuminator according to claim 1, wherein the optical element is provided in a position where the optical element intersects an optical axis of the wavelength converter.

5. The illuminator according to claim 1, wherein the wavelength converter includes a wavelength conversion layer that converts the first light into the second light, a reflection layer provided at a first surface of the wavelength conversion layer, and a structural element provided at a second surface of the wavelength conversion layer.

6. A projector comprising:

the illuminator according to claim 1;

a light modulator that modulates light from the illuminator in accordance with image information; and a projection optical apparatus that projects the light modulated by the light modulator.

7. An illuminator comprising:

a first light emitter that outputs first light that belongs to a first wavelength band;

a first parallelizer that parallelizes the first light outputted from the first light emitter;

a wavelength converter that includes a wavelength conversion layer having a first surface on which the first light is incident and a second surface different from the first surface and converts the first light into second light that belongs to a second wavelength band different from the first wavelength band;

an optical element that reflects one of light that belongs to the first wavelength band and light that belongs to the second wavelength band and transmits another of the light that belongs to the first wavelength band and the light that belongs to the second wavelength band;

a first focusing system that is provided between the first parallelizer and the optical element and has positive power;

a diffuser that is provided between the first focusing system and the optical element and diffuses the first light that exits out of the first focusing system; and a second focusing system that is provided between the optical element and the wavelength converter and has positive power, wherein the second focusing system has a focal point located between a principal point of the second focusing system and the second surface of the wavelength conversion layer, and the illuminator satisfies Expression (2) below, $$\alpha \leq 2 \cdot \tan^{-1}(H/F) \text{(where } \alpha < \Pi) \qquad (2)$$

where F is a focal length of the first focusing system, H is a distance from an optical axis to an outermost light ray of the first light that enters the first focusing system, and $\alpha$ (rad) is an angle of diffusion achieved by the diffuser.

* * * * *